United States Patent [19]

Harshberger, Jr.

[11] 4,289,999
[45] Sep. 15, 1981

[54] DIGITAL VARIABLE VOLTAGE LEVEL CONTROL CIRCUIT WITH AUTOMATIC RETURN TO NEUTRAL

[75] Inventor: Robert P. Harshberger, Jr., San Jose, Calif.

[73] Assignee: Ampex Corporation, Redwood City, Calif.

[21] Appl. No.: 38,951

[22] Filed: May 14, 1979

[51] Int. Cl.³ ............................................. H02P 5/16
[52] U.S. Cl. ..................... 318/341; 318/314; 318/318; 242/75.51
[58] Field of Search ............... 318/305, 349, 341, 601, 318/604, 663, 314, 318; 338/96, 99; 179/15.55 T; 360/70, 73; 242/75.51

[56] References Cited

U.S. PATENT DOCUMENTS

| | | | |
|---|---|---|---|
| 3,452,258 | 6/1969 | Thompson | 318/604 |
| 3,483,362 | 12/1969 | Feldmann et al. | 318/604 |
| 3,504,362 | 3/1970 | Feldmann | 318/604 |
| 3,663,881 | 5/1972 | Ehrenfried et al. | 318/663 |
| 3,699,492 | 10/1972 | Yoshihara | 338/96 |
| 3,795,851 | 3/1974 | Gage et al. | 318/604 |
| 3,887,856 | 6/1975 | Cicchiello | 318/391 |
| 3,949,175 | 4/1976 | Tanizoe et al. | 179/15.55 |
| 4,053,283 | 7/1977 | Mathewson | 179/15.55 |

Primary Examiner—David Smith, Jr.
Attorney, Agent, or Firm—Robert G. Clay; George B. Almeida

[57] ABSTRACT

A control circuit generates a variable analog output voltage in response to momentary closure of touch control means by an operator. The control level selected via the touch control means is sampled, digitized, digitally stored and reconverted to the analog output voltage for driving a motor at a commensurate speed. Selection of a different control level generates a correspondingly different digital value and thus a different analog output voltage. The selected control level and the corresponding analog output voltage may be maintained for an extended period of time until a new selection is made, or a different operating mode is entered. A mode change causes an automatic reset to a neutral operating condition (e.g., zero analog output voltage).

8 Claims, 1 Drawing Figure

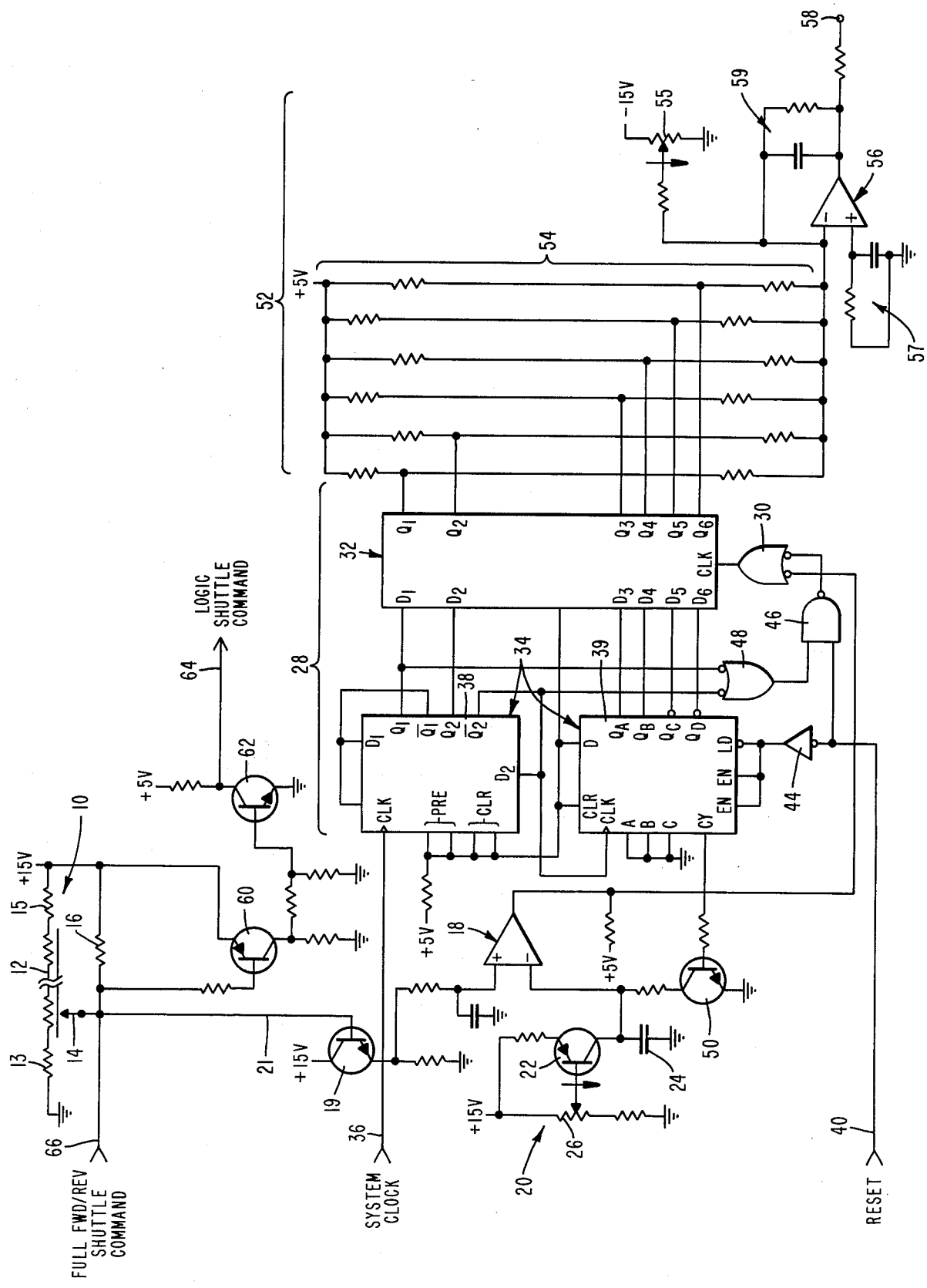

DIGITAL VARIABLE VOLTAGE LEVEL CONTROL CIRCUIT WITH AUTOMATIC RETURN TO NEUTRAL

BACKGROUND OF THE INVENTION

1. Field

The invention relates to a voltage level control circuit and, in particular, to an operator interface control circuit for digitally providing variable shuttle speed control of a tape transport.

2. Prior Art

Variable shuttle speed control as employed in audio, video, etc., tape transports during, for example, a tape editing process, requires tape speeds ranging from full shuttle speed in either direction during tape transfer, to zero speed when the desired edit location is found. Such variable speed shuttle processes heretofore have been controlled by a standard rotary or linear potentiometer, and include a zero or neutral setting during which no output is generated. The potentiometer is mechanically rotated or linearly slid to either side of the neutral position to generate forward or backward tape transfer at variable shuttle speeds. Accordingly, searching for an edit location in an audio system generally involves transferring tape by selected cranking of the mechanical potentiometer while listening to the garbled audio ("monkey chatter") generated by the high shuttle speed reproduction until a silent spot, etc., is located indicating the desired edit location. The tape is then shuttled back and forth at relatively slower shuttle speeds by jockeying the potentiometer through smaller rotations back and forth across the neutral position until the exact edit location is determined. The potentiometer is then turned to the neutral position to stop the tape. Such a process is cumbersome and time consuming.

In addition, such prior art rotary or linear potentiometers require mechanical or manual reset to the neutral position if and when the transport enters a mode other than the shuttle mode, viz, the stop, record or reproduce modes. Thus if the potentiometer is set to a selected shuttle speed, and the transport is thereafter operated in a different mode, the transport will return to the operating speed previously set upon re-entering the shuttle mode. This is an undesirable condition.

SUMMARY OF THE INVENTION

The control circuit herein described overcomes the disadvantages of the prior art by providing a digitally generated, variable output voltage signal in response to an electrically operable touch control strip, wherein the control circuit is electrically and automatically reset to the neutral position when the apparatus enters a different mode of operation.

To this end, momentarily touching the touch control generates a corresponding control signal. The latter is digitized, stored in a digital latch for an extended period of time during which it is reconverted to an analog output voltage for motor control. Upon touching a corresponding different part of the touch control strip, a different control signal is digitized and stored with a correspondingly different analog output voltage and motor speed. Upon entering a different mode of operation, the digital latch automatically is set to a neutral value corresponding to the neutral or stopped condition of the tape transport.

BRIEF DESCRIPTION OF THE DRAWINGS

The single FIG. 1 is a schematic diagram exemplifying implementation of the invention combination as used in an audio tape transport to provide variable shuttle speeds.

DESCRIPTION OF THE PREFERRED EMBODIMENT

Referring to the FIGURE, a touch control means 10 is shown schematically, and includes a resistive element 12 formed of a large number of serial resistors, and a touch responsive wiper element 14. One end of the resistive element 12 is grounded via a resistor 13, and the other end is coupled to a +15 volt supply via a further resistor 15. The wiper base of the wiper element 14 is coupled to the +15 volt supply via a resistor 16, and also to a positive input of a comparator 18 via an amplifier transistor 19 and a control line 21. When the wiper element 14 is not touched, the touch control means 10 delivers +15 volts to the comparator 18 via the resistor 16. When the wiper element 14 is touched, the means 10 delivers a control signal voltage via line 21 which is greater than zero and less than +15 volts, depending upon where the means 10 is touched.

The comparator 18 is coupled at its negative input to a ramp generator 20 formed of a transistor 22, whose emitter is coupled to a +15 volt supply via a resistor, and whose collector is coupled to ground via a capacitor 24. The base thereof is coupled to a variable tap of a potentiometer 26, which is coupled between the +15 volt supply, and ground via a resistor. The ramp generator 20 provides a sawtooth waveform by charging and discharging the capacitor 24 as described below.

The comparator 18 is coupled to means for analog-to-digital conversion, generally indicated at 28, and particularly to a +5 volt supply via a resistor, and to one input of a NOR gate 30. The latter's output is coupled to the clock input of a (6-bit) digital latch 32, whose data inputs are coupled to the Q outputs of a (6-bit, divide-by 64) counter 34, formed herein by a 2-bit counter 38 and a 4-bit counter 39.

A fixed frequency system clock is fed via input 36 to the clock input of the counter 34. A reset signal is fed via input 40 to load and enable inputs of the counter 34 via an inverter 44. The reset signal is also fed to a NAND gate 46, and thence to the second input of the NOR gate 30. The second input to NAND gate 46 is coupled to the Q1 and Q2 outputs of the counter 34 via a NOR gate 48. The $\overline{Q2}$ output of the counter 34 is also fed to the D2 and clock inputs thereof. The carry output of the counter 34 is coupled to the base of a transistor 50, whose emitter is grounded and whose collector is coupled to the negative input of the comparator 18 via a resistor.

The binary output of the means for analog-to-digital conversion 28 is then coupled to means for digital-to-analog conversion, generally indicated at 52. Ergo, the Q outputs of the latch 32 are coupled to respective binary weighted resistors 54. The latter are coupled to a −15 volt supply via a voltage off-set potentiometer 55, as well as to a negative input of an operational amplifier 56. The positive input thereof is coupled to ground via a parallel bypass capacitor/resistor 57. A further parallel capacitor/resistor 59 is coupled from the negative input to the output of the operational amplifier 56, to provide roll-off of the quantized data fed to the amplifier. The operational amplifier 56 provides an analog output signal on output 58 whose voltage level corresponds to the value of the control signal generated via the touch control means 10.

The emitter of a transistor 60 is coupled to the +15 volt end of the resistor 16, the base is coupled to the opposite end of the resistor 16, and the collector thereof is coupled via resistors to ground and to the base of a second transistor 62. The latter's emitter is grounded and the collector thereof is coupled to the +5 volt supply. The transistors 60, 62 provide a shuttle mode sensing circuit, wherein the collector output of transistor 62 provides a logic shuttle command via a line 64 thereof, which sets the capstan servo of the tape transport for operation in the shuttle mode.

Full speed forward and reverse shuttle commands are introduced to the control circuit via a line 66 and respective full speed shuttle control pushbuttons (not shown) of the tape transport. The commands correspond to the near zero volt, or to the near +15 volt, settings of the touch control means 10 and drive the tape transport at its full shuttle speed in the forward or reverse direction.

In operation, the wiper element 14 only makes contact with the resistive element 12 when pressed by an operator, at which time the touch control means 10 generates an analog control signal level in the form of an analog control voltage which lies within the range of greater than zero to less than +15 volts. The analog control signal is fed via line 21 and transistor 19 to the analog comparator 18, which also receives the sawtooth waveform from the ramp generator 20. The ramp is determined by charging and discharging the capacitor 24, wherein the time of discharge is controlled by the counter 34 via the amplifying transistor 50. That is, the counter 34 is driven by the fixed frequency clock on input 36, whereby when it reaches the final count of 63 a carry is generated by the counter 34 and enables the transistor 50 to discharge the capacitor 24. Thus, the ramp generated is proportional at any point to the count in the counter 34. The capacitor then begins to recharge. When the count of the counter 34 corresponds to the control level generated by the touch control means 10, the analog comparator 18 clocks the output of the counter 34 into the latch 32 for storage therein. Thus, although the touch control means 10 is only momentarily pressed, the digital word representing the desired analog output signal and the corresponding motor speed, is stored for an extended period of time in the digital latch 32.

It is to be understood that there are other schemes and associated components for generating the digital values which are stored in the latch 32. For example, schemes employing dual slope, successive approximation, etc., techniques may be used in generally conventional fashion.

The output from the latch 32 is D/A converted via the binary weighted resistors 54 and the operational amplifier 56. The output of the amplifier 56 provides a very stable analog output voltage corresponding to the control level selected via the touch control means 10. The output voltage is used herein to drive a motor in the shuttle mode, but may also be used in any situation to control any variable whose value must be held for an extended period of time, and/or the system requires an electrical reset. Such systems generally employ a potentiometer, rheostat, etc., for the stepped or continuous variation of the output voltage level. The level may be stored for any length of time with no decay, drift, etc., as in analog control schemes. A new analog output voltage is selected at any time by pressing the corresponding point on the touch control means 10.

When the touch control means 10 is touched the transistors 60, 62 are enabled, which feeds a low logic level defining the logic shuttle command to the transport via line 64, to direct the tape transport into the shuttle mode. Thus, the transistors 60, 62 define a shuttle mode sensor which detects when the touch control means 10 is touched, and also when the full speed forward or reverse shuttle pushbuttons are energized (line 66). In the event the tape transport enters a mode other than the shuttle mode, i.e., stop, record, reproduce, etc., a reset signal is fed from the tape transport on line 40, which sets the counter 34 to mid-count, since the inputs A, B, C are grounded and input D is high in this particular example. At this time the counter 34 is loaded with the mid-count of 32 and is held there. The mid-count corresponds to the neutral control signal level, i.e., to a zero analog output voltage on output 58 to the motor. Thus the tape transport motor is automatically reset to zero shuttle speed any time the apparatus enters an operating mode other than shuttle, and maintains the zero setting via the digital mid-count stored in the latch 32 until another level is selected via the touch control means 10, or until the full speed forward or reverse shuttle command is entered on line 66. When the level is selected via the touch control means 10, the corresponding count in the counter 34 is clocked into the latch 32. When the full reverse or forward shuttle command is initiated, the near zero, or near full count, respectively, is clocked from counter 34 into the latch 32.

Obviously, the counter 34 may be loaded with any preselected count other than mid-count 32 depending upon the desired output for the neutral state, or whether additional output voltage levels other than mid-count are to be pre-set. For example, if a pre-set series of voltage output levels is desired, the counter 34 is loaded via the reset input 40 with various digital words applied to the pre-set inputs of the counter 34. The pre-set words are then loaded into the latch 32 in response to the reset input 40.

Since the resistive element 12 is coupled to ground, and to the +15 volt supply, via resistors 13, 15, respectively, there is no tap for ground or the +15 volts. Thus the touch control means 10 generates control voltages within the range of voltages greater than zero volts, or less than +15 volts. Thus the shuttle mode sensor circuit of transistors 60, 62 may detect when the shuttle mode is entered. In addition, the ramp supplied by ramp generator 20 varies from zero to a final value of less than +15 volts. Thus, if the touch control means 10 is not activated, the comparator 18 will not clock the counter data into the latch 34.

By way of example only, the counter 34 is depicted as a divide-by-64 counter, and the ramp from ramp generator 20 corresponds to a full 64 counts (i.e., zero to 63) as clocked by the system clock on line 36. Thus when the control signal on line 21 equals the value of the ramp, the comparator 18 clocks whatever count is in the counter 34 into the latch 32. The latch 32 stores the digital value and generates the corresponding analog output voltage via the means for digital-to-analog conversion 52.

The gates 30, 46, 48 provide for gating the system clock through to set the latch 32 when the control circuit is not in the shuttle mode, i.e., when the control line 21 is at +15 volts. The gate arrangement varies depending upon the counter 34 chip configuration.

What is claimed is:

1. A control circuit for generating a readily varied analog output voltage signal for controlling the speed of a tape transport in a selected mode of operation, and including an operator generated control command commensurate with the desired speed from zero to maximum, comprising the combination of:

means including a touch control means for generating selected digital values which are representative of the operator generated control command;

said generating means including counter means for counting through a selected number of digital values within a preselected range of digital values in response to a fixed frequency clock; and comparator means coupled to the touch control means for selecting the selected digital value within the preselected range of values in response to the operator control command;

means coupled to the counter means for digitally holding and continuously supplying a selected digital value for an extended time period in response to the comparator means; and means for reconverting each continuously supplied digital value to define the desired analog output voltage signal representative of the operator generated control command.

2. The circuit of claim 1 wherein;

the touch control means includes analog means for generating a control voltage level commensurate with the operator generated control command and the desired speed;

the generating means includes ramp generating means for supplying a ramp signal corresponding to the preselected range of digital values; and said means for digitally holding and continuously supplying being responsive to the comparator means for holding and supplying the selected digital value when the control voltage level is equal to the ramp signal.

3. The circuit of claim 2 wherein;

the counter means includes an up counter for counting increasing digital values over the preselected range of digital values corresponding to the ramp signal; and the means for digitally storing includes a digital latch coupled to the up counter, wherein the digital latch is loaded with the selected digital value in response to the comparator means when the ramp signal is equal to the control voltage level.

4. The circuit of claim 3 wherein;

the means for generating a control voltage level includes the touch control means coupled to one input of the comparator means, said ramp generating means being coupled to the other input of the comparator means;

said comparator means is coupled to the clock input of the digital latch;

gate means coupled between the up counter and the digital latch; and reset input means coupled to the gate means for presetting the up counter to a given digital value when the tape transport is in an operating mode other than the selected mode.

5. The circuit of claim 4 further including;

a full speed shuttle forward and reverse command input coupled to the comparator means and integral with the touch control means to pre-set the counter to the highest digital value of the range of digital values.

6. The circuit of claim 5 wherein the means for reconverting the stored selected digital values includes;

digitally weighted resistor means coupled to the digital latch; and operational amplifier means coupled to the digitally weighted resistor means.

7. The circuit of claim 6 further including;

shuttle mode sensor means coupled to the touch control means for supplying a logic shuttle command to the tape transport to direct the latter into the shuttle mode of operation.

8. The circuit of claim 7 wherein the carry output of the counter is operatively coupled to the ramp generating means and to the comparator means for disabling the ramp generating means to terminate the ramp signal.

* * * * *